United States Patent
Liu et al.

(10) Patent No.: US 8,719,597 B2
(45) Date of Patent: May 6, 2014

(54) POWER CONTROL SYSTEM, POWER CONTROL METHOD, AND COMPUTER SYSTEM THEREOF

(75) Inventors: Hung-Hsiang Liu, Taipei Hsien (TW); Chien-Yu Chiu, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 378 days.

(21) Appl. No.: 12/801,556

(22) Filed: Jun. 15, 2010

(65) Prior Publication Data
US 2011/0219223 A1 Sep. 8, 2011

(30) Foreign Application Priority Data
Mar. 5, 2010 (TW) .................................. 99106536 A

(51) Int. Cl.
*G06F 1/00* (2006.01)
(52) U.S. Cl.
USPC .......................................... 713/300; 713/310
(58) Field of Classification Search
USPC ........................................................... 713/310
See application file for complete search history.

(56) References Cited

U.S. PATENT DOCUMENTS

| | | | | |
|---|---|---|---|---|
| 6,072,250 A | * | 6/2000 | Thandiwe et al. | 307/150 |
| 2003/0074589 A1 | * | 4/2003 | Sanchez | 713/310 |
| 2006/0232133 A1 | * | 10/2006 | Cha | 307/23 |

* cited by examiner

*Primary Examiner* — Kim Huynh
*Assistant Examiner* — Vincent Chang
(74) *Attorney, Agent, or Firm* — Bacon & Thomas, PLLC

(57) ABSTRACT

A power control system, a power control method, and a computer system thereof are disclosed. The power control system comprises a control module for receiving a control signal. A power management module is used for receiving a power signal and outputting an auxiliary power. A first switch module receives the control signal and controls the power management module to output the auxiliary power to the control module by the control signal. A second switch module controls the first switch module. After receiving the control signal, the control module determines whether the control signal is continuously received until a predetermined time. If yes, the control module controls the first switch module to transmit the auxiliary power continuously with the second switch module and receives the power signal to execute a boot procedure.

7 Claims, 3 Drawing Sheets

POWER CONTROL SYSTEM, POWER CONTROL METHOD, AND COMPUTER SYSTEM THEREOF

BACKGROUND OF THE INVENTION

1. Field of the Invention

The present invention relates to a power control system, a power control method, and a computer system thereof and, more particularly, to a power control system, a power control method, and a computer system thereof capable of preventing power consumption under the shutdown state.

2. Description of the Related Art

With developments in technology, the computer system is more and more ubiquitous. When the computer system shuts down, the power signal will be inputted continuously to ensure the computer system can boot successfully. For example, when a laptop computer is in the shutdown state, power provided from a battery or from a household power source will be consumed continuously. Therefore, the power will be wasted.

On the other hand, with the promotion of environmental responsibility, when the laptop computer is packed, the battery is installed in the laptop computer to reduce extra packaging. As a result, the laptop computer may consume the power supplied by the battery continuously. Therefore, when the user acquires a brand new laptop computer, the user has to charge the battery before booting the laptop computer. However, it will cause more inconvenience to the user.

Therefore, it is desirable to provide a power control system and a power control method to mitigate and/or obviate the aforementioned problems.

SUMMARY OF THE INVENTION

A primary objective of the present invention is to provide a power control system and a computer system thereof capable of preventing power consumption under the shutdown state.

Another main objective of the present invention is to provide a power control method.

In order to achieve the abovementioned objective, the power control system of the present invention is used for a computer system and for receiving a power signal supplied by a power supply module to execute a boot procedure by a control signal. The power control system comprises a control module, a power management module, a first switch module, and a second switch module. The control module is used for receiving the control signal. The power management module is electrically connected to the control module and receives the power signal to output an auxiliary power. The first switch module is electrically connected to the control module and the power management module and controls the power management module. The first switch module controls the power management module to output the auxiliary power to the control module by the control signal. The second switch module is electrically connected to the control module and the first switch module and controls the first switch module. After the control module receives the control signal, the control module determines whether the control signal is continuously received until a predetermined time; if yes, the control module controls the first switch module to transmit the auxiliary power continuously by the second switch module and receives the power signal to execute the boot procedure.

The power control method of the present invention comprises the following steps: inputting a control signal; controlling a first switch module to input an auxiliary power by the control signal; determining whether the control signal is continuously received until a predetermined time; if yes, controlling the first switch module with the second switch module to transmit the auxiliary power continuously; and receiving the power signal to execute a boot is procedure.

The computer system of the present invention comprises a power supply module, a power button, and a power control system. The power supply module is used for supplying a power signal. The power button is used for inputting a control signal. The power control system is electrically connected to the power supply module and the power button. The power control system comprises a control module, a power management module, a first switch module, and a second switch module. The control module receives the control signal. The power management module is electrically connected to the control module and receives the power signal to output an auxiliary power. The first switch module is electrically connected to the control module and the power management module and controls the power management module. The first switch module is used for controlling the power management module to output the auxiliary power to the control module by the control signal. The second switch module is electrically connected to the control module and the first switch module and controls the first switch module. After the control module receives the control signal, the control module determines whether the control signal is continuously received until a predetermined time. If yes, the control module controls the first switch module with the second switch module to transmit the auxiliary power continuously and receives the power signal to execute the boot procedure.

Other objectives, advantages, and novel features of the invention will become more apparent from the following detailed description when taken in conjunction with the accompanying drawings.

DETAILED DESCRIPTION OF THE PREFERRED EMBODIMENT

The advantages and innovative features of the invention will become more apparent from the following descriptions of the preferred embodiments.

Figure 1:
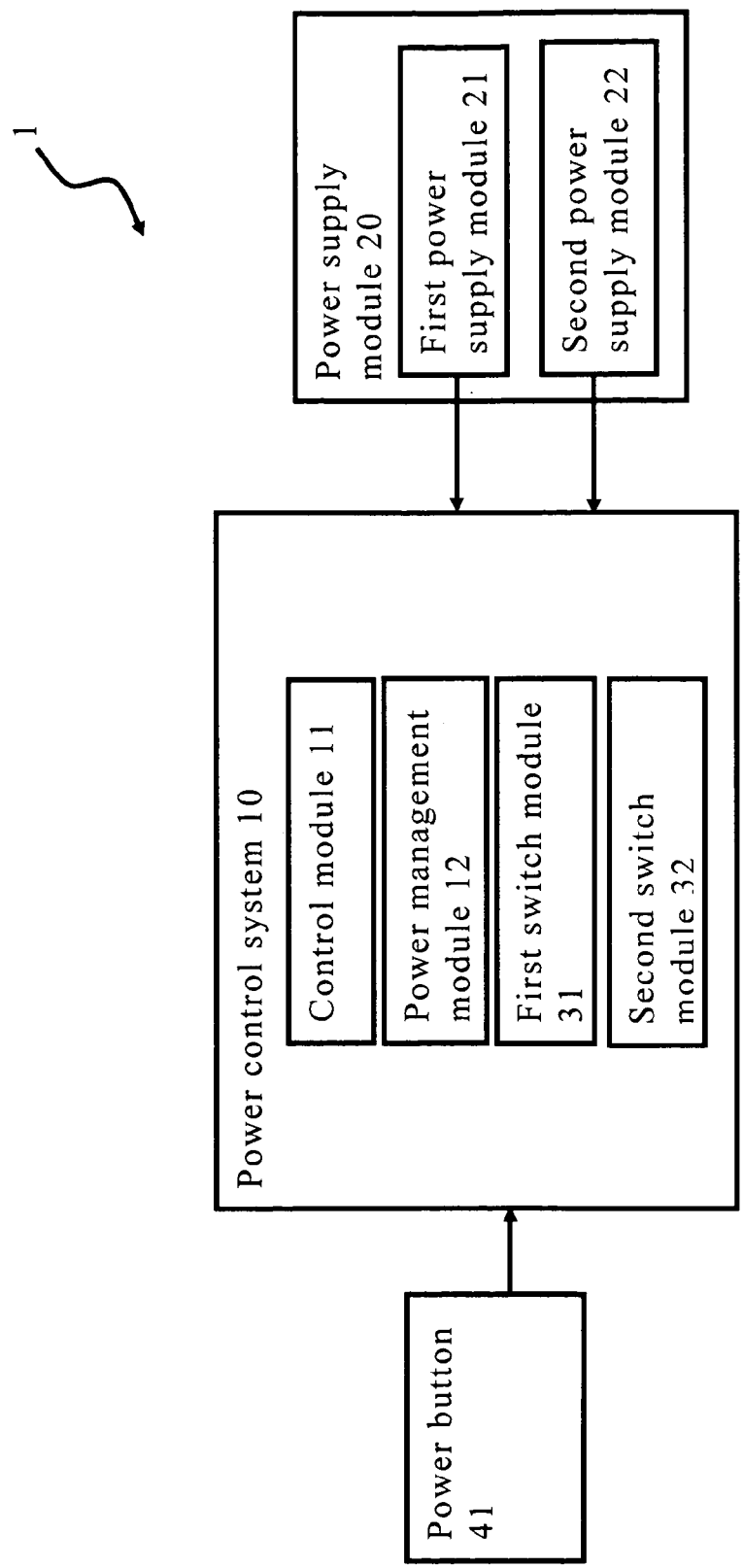
FIG. 1 is a block diagram of a computer system of the present invention.

Please refer to FIG. 1. FIG. 1 is a block diagram of a computer system of the present invention.

The power control system 10 of the present invention is disposed in a computer system 1. In one embodiment of the invention, the computer system 1 can be a laptop computer or a mobile phone capable of computing and processing, but the invention is not limited only to these devices. The computer system 1 comprises a power control system 10, a power supply module 20, and a power button 41. The power supply module 20 is electrically connected to the power control system 10 and used for generating a power signal that is sent to the control module 11 or other electronic components of the computer system 1. The power supply module 20 comprises a first power supply module 21 and a second power supply module 22. The first power supply module 21 can be a slot module for connecting to a household power supply and is used for providing a first power signal, which is transformed from an alternating current power signal. The second power supply module 22 can be a battery module and is used for providing a second power signal, which is transformed from a direct current power signal. The power button 41 is electrically connected to the power control system 10 and used for allowing a user to input a control signal for booting the computer system 1.

The power control system 10 comprises a control module 11, a power management module 12, a first switch module 31, a second switch module 32, and other electronic components.

Figure 2:
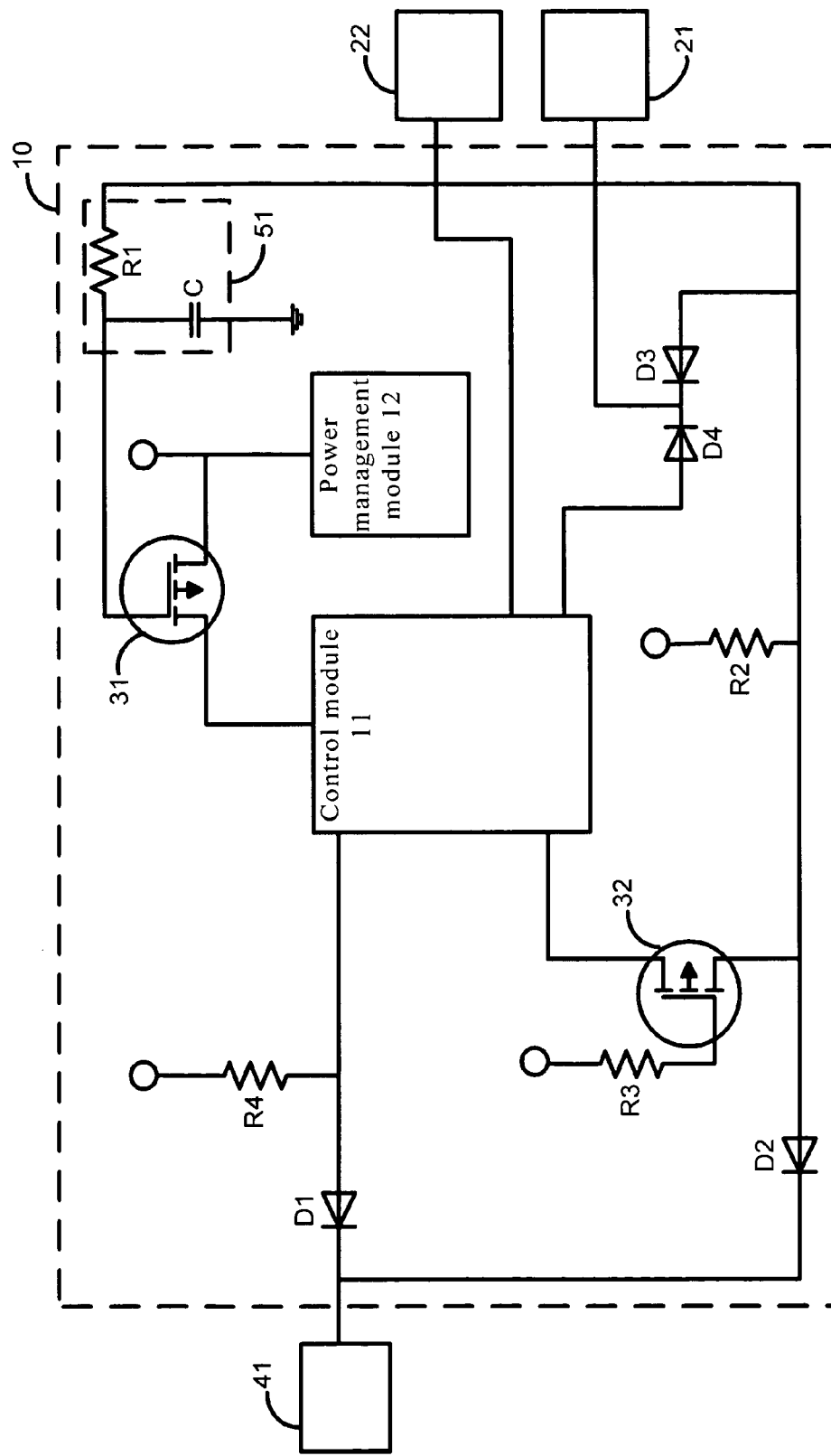
FIG. 2 is a circuit diagram drawing of a power control system of the present invention.

Next, please refer to FIG. 2. FIG. 2 is a circuit diagram drawing of a power control system of the present invention.

The power control system 10 comprises a control module 11, a power management module 12, a first switch module 31, a second switch module 32, a buffer module 51, and other electronic components, such as diodes D1, D2, D3, D4, resistances R1, R2, R3, R4, and a capacitor C.

The control module 11 can be a keyboard control chip (KBC) or a microprocessor. The control module 11 is used for determining whether the boot procedure is executed and also used for executing the necessary process when the computer system 1 is booting. The power management module 12 is electrically connected to the control module 11. The power management module 12 can be a power IC and is used for receiving a power signal and outputting an auxiliary power to the control module 11 and lets the control module 11 perform a standby mode.

The first switch module 31 is electrically connected to the control module 11 and the power management module 12 and is used for controlling the auxiliary power supplied by the power management module 12 for transmission to the control module 11. The second switch module 32 is electrically connected to the control module 11 and the first switch module 31. The control module 11 is used for controlling the first switch module 31 with the second switch module 32 to determine whether the first switch module 31 cuts off or transmits the auxiliary power continuously. The first switch module 31 and the second switch module 32 are made of a metal-oxide-semiconductor (MOS), such as P-MOS or N-MOS. In one embodiment of the invention, the first switch module 31 and the second switch module 32 are both composed of P-MOS, but the invention is not limited only to these devices.

The power control system 10 further comprises a buffer module 51 comprising a resistance R1 and a capacitor C. The buffer module 51 is used for providing a buffering effect to prevent the voltage from dropping suddenly during signal potential conversion or transmission of the auxiliary power. The diodes D1 to D4 are used for preventing signal confusion or a reverse signal transmission. For example, the diode D1 is used for preventing the control signal from being reverse transmitted from the power control system 10 to the power button 41 in order to prevent electrical leakage. The diode D2 is used for preventing the first power signal supplied by the first power supply module 21 from being confused with the control signal and preventing the control module 11 from mistaking the first power signal for the control signal. The resistances R2 to R4 are used for preventing misidentification of the signal. Because the usage of the abovementioned buffer module 51, diodes D1 to D4, resistances R1 to R4, and capacitor C are similar to general circuit design and are not the points of improvement of the present invention, no more description is provided.

The control module 11 is used for determining whether the computer system 1 connects to the first power supply module 21 or connects to the second power supply module 22. When the computer system 1 connects to the first power supply module 21, the first power supply module 21 is used for outputting the first power signal to activated the first switch module 31 and transmit the auxiliary power to the control module 11. Therefore, the control module 11 can perform a standby mode and wait the control signal to be inputted to boot the computer system 1.

When the computer system 1 connects to the second power supply module 22, the control module 11 must determine whether the boot procedure is executed first before the control module 11 performs the standby mode in order to save the power supplied by the second power supply module 22.

When the user presses the power button 41, the control module 11 will receive the control signal. At this time, the control signal is transmitted to the first switch module 31 and is used for controlling the power management module 12 to transmit the auxiliary power to the control module 11. After the control module 11 receives the auxiliary power, the control module 11 performs the standby mode and executes the necessary procedures of the computer system 1. Then the control module 11 will check whether the control signal is continuously received until a predetermined time, wherein the predetermined time is substantially equal to or larger than 40 ms. If the control signal is not continuously received until 40 ms, it may indicate that the user has touched the power button 41 inadvertently. The predetermined time can be selected based on the requirement or utilization, such as 100 ms, but the present invention does not limit the predetermined time. Therefore, the control module 11 outputs a high potential signal to the second switch module 32 and further controls the first switch module 31 to cut off the auxiliary power transmitted to the control module 11. In that way, the control module 11 will lose the power signal completely. If the control signal is continuously received until 40 ms, the control module 11 will output a low potential signal to the second switch module 32 and control the first switch module 31 to transmit the auxiliary power sequentially. Then the control module 11 is able to execute the boot procedure by the power signal. When the computer system 1 shuts down, the method above will make the control module 11 lose the power signal completely in order to save the power supplied by the second power supply module 22.

Figure 3:
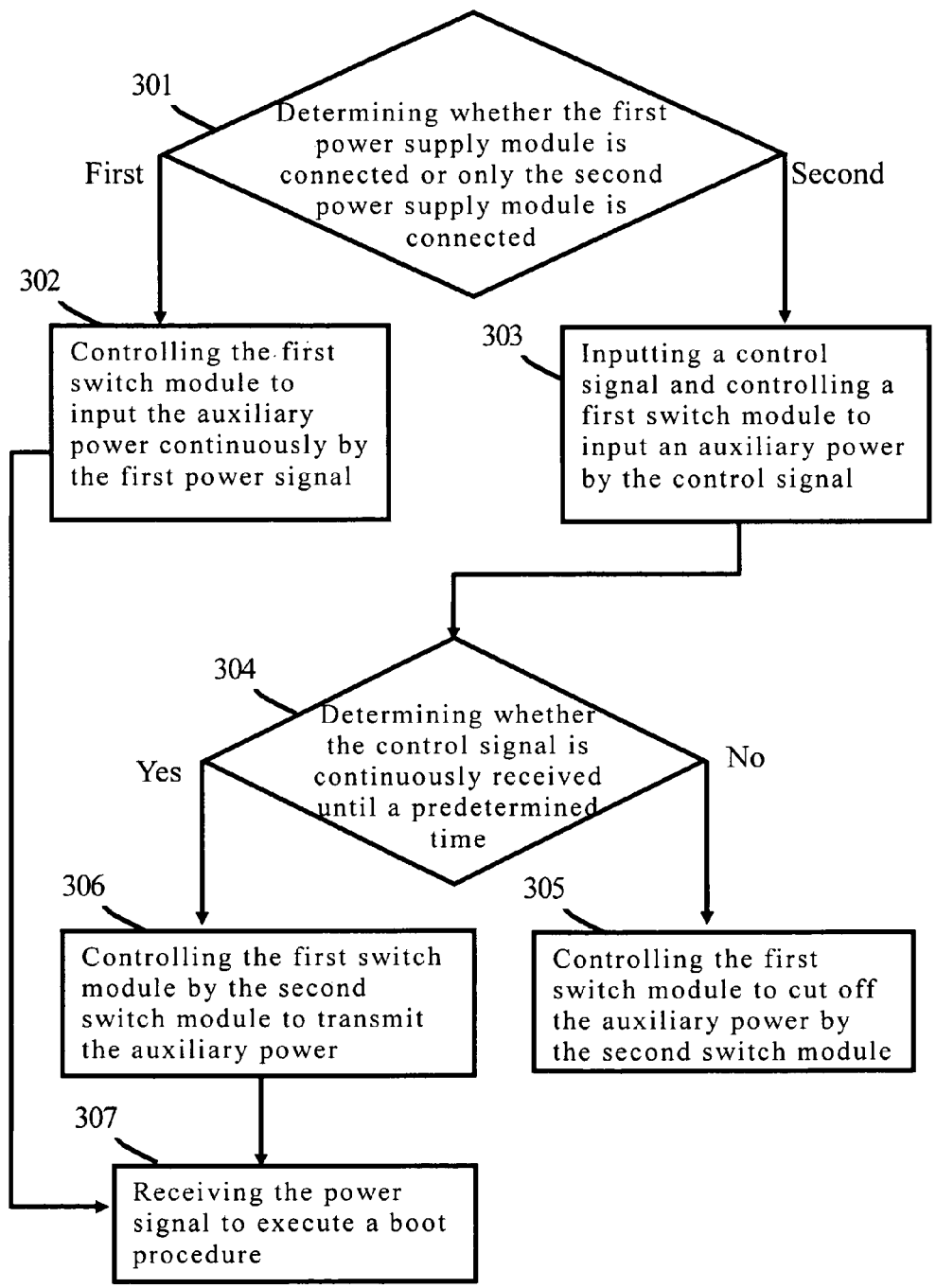
FIG. 3 is a flow chart of a power control method of the present invention.

Please refer to FIG. 3. FIG. 3 is a flow chart of a power control method of the present invention. Please note that although the power control method is illustrated using the computer system 1 along with the power control system 10, the power control method is by no means restricted to usage only with the power control system 10.

First, the power control system 10 performs step 301: determining whether the first power supply module is connected, or only the second power supply module is connected.

The control module 11 of the power control system 10 is used for determining whether the computer system 1 is connected to the first power supply module 21 or is only connected to the second power supply module 22.

If the first power supply module 21 is connected, then step 302 is performed: controlling the first switch module to input the auxiliary power continuously by the first power signal.

In step 302, the power signal of the first power supply module 21 controls the first switch module 31 sequentially, and allowing the power management module 12 to transmit the auxiliary power to the control module 11 continuously. Meanwhile, the control module 11 performs the standby mode and waits for the user to press the power button 41 in order to execute the boot procedure of the computer system 1 sequentially. After the user presses the power button 41, step 307 will be performed to execute the boot procedure of the computer system 1. Step 307 will be described later.

If only the second power supply module 22 is connected, then the step 303 is performed: inputting a control signal and controlling a first switch module to input an auxiliary power by the control signal.

If only the second power supply module 22 is connected, the control module 11 will not perform the standby mode and is in a power cut-off situation. Therefore, the power consumption of the second power supply module 22 will be prevented.

After the user presses the power button 41, the control signal is inputted to the control module 11 and the first switch module 31. The control signal controls the first switch module 31 to input the auxiliary power supplied by the power management module 12 to the control module 11 and controls the control module 11 to perform the standby mode.

Then follows step 304: determining whether the control signal is continuously received until a predetermined time.

After the user presses the power button 41, the control signal is inputted to the control module 11 sequentially. After the control module 11 performs the standby mode in step 303, the control module 11 is used for determining whether the control signal is continuously received until a predetermined time; for example, the control signal is received until or exceeding 40 ms.

If the control signal is not received continuously until the predetermined time, then step 305 is performed: controlling the first switch module to cut off the auxiliary power by the second switch module.

If the control module 11 does not receive the control signal until the predetermined time, it indicates that the power button 41 has been touched inadvertently by the user. Therefore, the control module 11 controls the second switch module 32 to output a high potential signal and controls the first switch module 31 to cut off the signal outputted from the power management module 12 by the high potential signal, such as cutting off the auxiliary power.

If the control signal is received continuously until the predetermined time, then the step 306 is performed: controlling the first switch module with the second switch module to transmit the auxiliary power continuously.

If the control module 11 receives the control signal continuously until the predetermined time, the control module 11 controls the second switch module 32 to output a low potential signal and controlling the first switch module 31 to transmit the auxiliary power continuously by the low potential signal.

Finally, step 307 is performed: receiving the power signal to execute a boot procedure.

Finally, the power supply module 20 inputs the power signal. If the power supply module 20 is the first power supply module 21, then the first power supply module 21 inputs the first power signal. If the power supply module 20 has only the second power supply module 22, then the second power supply module 22 is used for inputting the second power signal. The control module 11 is capable of executing the boot procedure of the computer system 1.

Please note that after step 302 is performed, the control module 11 can also be used for determining whether the control signal is received until the predetermined time (i.e., step 304) before performing step 307 in order to avoid booting up due to the power button 41 being touched by the user inadvertently.

Take note that the step of the power control method is not restricted to the abovementioned sequence. The order of the steps can be modified as long as the objectives of the invention are attained.

By the method and the circuit system abovementioned, the computer system 1 of the present invention is capable of cutting the power signal completely under the shutdown state, and the boot procedure will not be executed if the power button 41 is touched inadvertently. Therefore, the power can be saved.

Although the present invention has been explained in relation to its preferred embodiment, it is to be understood that many other possible modifications and variations can be made without departing from the spirit and scope of the invention as hereinafter claimed.

What is claimed is:

1. A power control system for use in a computer system and for receiving a power signal supplied by a power supply module to execute a boot procedure by a control signal inputted by a power button; wherein the power signal is a first power signal or a second power signal; the first power signal is transformed from an alternating current power signal and the second power signal is transformed from a direct current power signal, the power control system comprising:
   a control module used for receiving the control signal;
   a power management module electrically connecting to the control module and receiving the power signal to output an auxiliary power;
   a first switch module electrically connecting between the control module and the power management module, wherein the first switch module is used for controlling the power management module to output the auxiliary power through the first switch module to the control module by the control signal, wherein the control module performs a standby mode when the auxiliary power is received; and
   a second switch module electrically connecting to the control module and the first switch module and controlling the first switch module;
   wherein after the control module receives the control signal, the control module is used for determining whether the control signal is continuously received until a predetermined time; if yes, the control module controls the first switch module to transmit the auxiliary power continuously by the second switch module and receives the power signal to execute the boot procedure; and
   wherein the control module is further used for determining whether the received power signal is the first power signal or the second power signal; if the power signal is the second power signal and the control signal is not continuously received until the predetermined time, the control module is used for controlling the first switch module to cut off the auxiliary power with the second switch module; if the power signal is the first power signal, the first switch module is further used for controlling the power management module to output the auxiliary power to the control module with the first power signal.

2. The power control system as claimed in claim 1, the power control system further comprising at least one diode.

3. The power control system as claimed in claim 1, wherein the predetermined time is substantially equal to or larger than 40 ms.

4. The power control system as claimed in claim 1, the power control system further comprising a buffer module.

5. A power control method used in a computer system comprising the following steps:
   inputting a control signal by a power button;
   controlling a first switch module to input an auxiliary power outputted from a power management module through the first switch module to the control module by the control signal, wherein the control module performs a standby mode when the auxiliary power is received;

determining whether the control signal is continuously received until a predetermined time;

if yes, controlling the first switch module to transmit the auxiliary power continuously with a second switch module;

receiving a power signal to execute a boot procedure; and determining whether the power signal is a first power signal or a second power signal;

wherein the first power signal is transformed from an alternating current power signal and the second power signal is transformed from a direct current power signal; if the power signal is the second power signal and the control signal is not continuously received until the predetermined time, controlling the first switch module to cut off the auxiliary power with the second switch module; if the power signal is the first power signal, controlling the power management module to output the auxiliary power to the control module with the first power signal.

6. A computer system comprising: a power supply module used for supplying a power signal; wherein the power signal is a first power signal or a second power signal; the first power signal is transformed from an alternating current power signal and the second power signal is transformed from a direct current power signal;

a power button used for inputting a control signal; and a power control system electrically connecting to the power supply module and the power button and comprising:

a control module used for receiving the control signal; a power management module electrically connecting to the control module and receiving the power signal to output an auxiliary power;

a first switch module electrically connecting between the control module and the power management module, wherein the first switch module is used for controlling the power management module to output the auxiliary power through the first switch module to the control module by the control signal, wherein the control module performs a standby mode when the auxiliary power is receives; and a second switch module electrically connecting to the control module and the first switch module and controlling the first switch module; wherein after the control module receives the control signal, the control module is used for determining whether the control signal is continuously received until a predetermined time; if yes, the control module controls the first switch module to transmit the auxiliary power continuously with the second switch module and receives the power signal to execute a boot procedure;

wherein the control module is further used for determining whether the received power signal is the first power signal or the second power signal; if the power signal is the second power signal and the control signal is not continuously received until the predetermined time, the control module is used for controlling the first switch module to cut off the auxiliary power with the second switch module; if the power signal is the first power signal, the first switch module is further used for controlling the power management module to output the auxiliary power to the control module with the first power signal.

7. The computer system as claimed in claim 6, wherein the predetermined time is substantially equal to or larger than 40 ms.

* * * * *